Dec. 26, 1933. O. G. WARD 1,941,315
TEMPERATURE CONTROL
Filed April 3, 1933 2 Sheets-Sheet 2
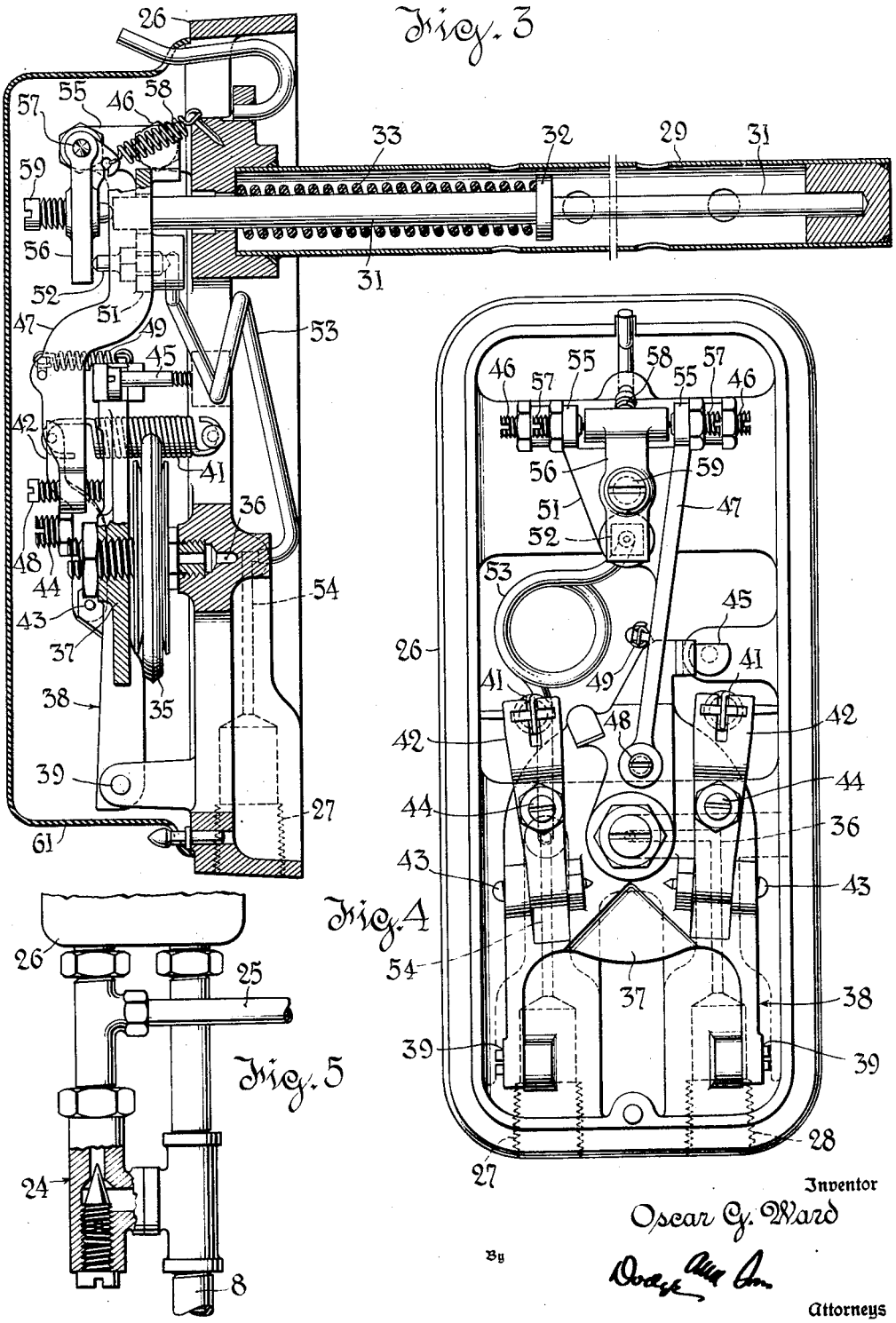

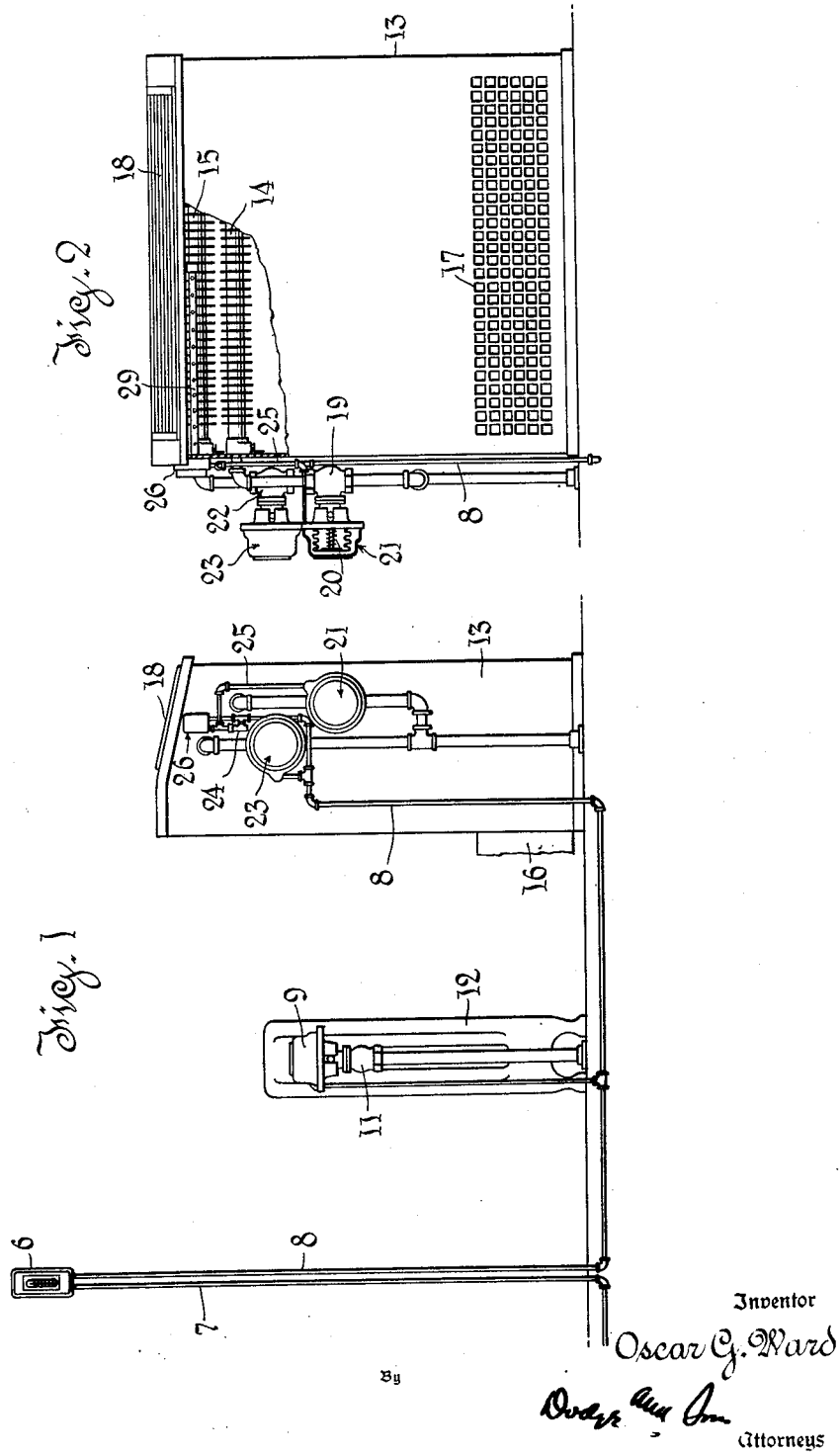

Patented Dec. 26, 1933

1,941,315

UNITED STATES PATENT OFFICE 1,941,315

TEMPERATURE CONTROL

Oscar G. Ward, Denver, Colo., assignor to Johnson Service Company, Milwaukee, Wis., a corporation of Wisconsin Application April 3, 1933. Serial No. 664,274

9 Claims. (Cl. 236—37)

This invention relates to temperature regulation, and particularly to the control of a heat source by two thermostatic means, one of which responds to the temperature of the space heated by said source, and the other of which imposes a limit on the output of heat by the heat source.

The invention contemplates an arrangement such that if the temperature in the room heated passes outside the limits which the room thermostat seeks to impose, the limiting thermostat will be given a compensatory adjustment which will at least reduce its tendency to aggravate the abnormal temperature condition of the room.

The invention is broadly applicable to a number of fields, but is intended primarily for use in controlling the heating of rooms. It may be applied to a wide variety of heating systems, but is peculiarly adaptable to systems in which air drawn partly from the room and partly from outdoors, is passed over a controllable heater and delivered to the room. It has been proposed heretofore to control such a heater primarily by a room thermostat and secondarily by a limiting thermostat, which, when the room thermostat shut down the heat source, functioned to regulate the heat source and preclude the discharge into the room of unduly cold air.

While such systems are satisfactory, they are subject to the objection that if the room temperature rises abnormally, because of the supply of heat not controlled by the room thermostat, the limiting thermostat functions to aggravate the condition.

According to the present invention, when the room temperature passes substantially beyond the control range of the room thermostat, the room thermostat functions to readjust the limiting thermostat and establish a lower limit for the temperature of the entering air.

Without implying any limitation of the invention to that particular field, the invention will now be described as applied to a heating system involving a direct radiation and a unit heater conjointly controlled by a room thermostat, the unit heater being subject to secondary control by a limiting thermostat.

In the drawings,—

Fig. 1 is a diagrammatic elevation showing the complete system for one room.

Fig. 2 is a front elevation of the unit heater, with parts broken away to show the heating units and the construction of the valve motors.

Fig. 3 is a vertical axial section through the limiting thermostat.

Fig. 4 is a front elevation of the limiting thermostat with the cover removed.

Fig. 5 is an enlarged section of the adjustable restricting fitting.

Referring first to Fig. 1, 6 represents a thermostat, and may conveniently be of the type described and claimed in the patent to Otto 1,500,260, July 8, 1924. So far as is material to the present description, it may be said that this thermostat receives compressed air from a supply line 7 and functions in response to changes in room temperature to establish a varying pressure in the branch line 8. The pressure in the line 8 rises as the temperature in the room rises and the pressure in the line 8 may be assumed to vary from atmospheric, when room temperature is at a chosen low value, say 70°, to 11 pounds when room temperature is at a chosen high value, say 72°. These figures are merely illustrative.

The branch line 8 is connected to a motor or motors which actuate heat controlling means. For example, the drawing illustrates a motor 9 which actuates a steam valve 11 to control the admission of steam to a radiator 12. The motor 9 acts under rising pressure to close the valve 11, the valve 11 being held open by a spring, in the usual manner. This spring is relatively weak, and for purposes of explanation, it will be assumed that the valve 11 closes completely when pressure in the line 8 reaches 4 pounds gage.

In the same room with the radiator 12 is a unit heater, indicated generally by the numeral 13, applied to its case. Generally stated, a unit heater is a cabinet having means arranged to draw air, partly from out of doors and partly from the room, or all from out of doors, pass the air over a heating unit or units in the cabinet, and deliver the air so heated to the room. It may include dampers for controlling or proportioning the fresh and recirculated air, or may omit such feature, but the presence or absence of such dampers is immaterial to the present invention.

For purposes of illustration I have chosen a unit heater of a known type having two heating units 14, 15, through which the air passes serially. The fresh air enters the cabinet at 16, the recirculated air enters the cabinet through the grill 17. The heated air is discharged to the room through the top grill 18. The lower heating unit 14 is controlled by a valve 19, which may be urged in a closing direction by a motor 21 acting in opposition to a spring 20, all of conventional form. This spring is of such strength that the valve 19 will close under a pressure of 11 pounds gage. The heating unit 15 is controlled by a valve 22 actuated by a motor 23, the valve being held open by a spring (not shown) the spring being of such strength that the valve 22 will be completely closed when the motor 23 is subjected to a pressure of 8 pounds gage.

The line 8 is connected directly to the motor 23 and is connected to the motor 21 through an adjustable needle valve 24 and branch extension 25, the purpose being to restrict the rate of supply of air to the motor 21 so that the motor 21 may be vented by the limiting thermostat at a rate which exceeds the adjusted capacity of the needle valve 24. Such venting is controlled by the limiting thermostat and is the means by which the limiting thermostat takes control under conditions which will be described. Arrangements of the type so far described have heretofore been known, and no broad claim is here made to such a combination.

The position of the limiting thermostat is clearly indicated in Figs. 1 and 2 as above the upper heating unit 15. As far as the invention is concerned, it may be located at any point where it might regulate that heating unit which is last shut down by the thermostat 6 to establish a low temperature limit for air discharging from the top of the unit heater. Various positions have been proposed for the limiting thermostat in addition to that shown. For example, a location between the two heating units, and even a location at the entrance of the fresh air duct, for obviously, control in response to the temperature of the cold entering air will give reasonably satisfactory results, though not as good results as the location illustrated in the drawings.

The construction of the thermostat is fully illustrated in Figs. 3 and 4, to which reference will now be made.

The thermostat is mounted on a base 26 which is provided with two connections, the first, 27, being connected to the branch extension pipe 25, and hence to the valve motor 21, the second, 28, being connected directly to the branch pipe 8, so that this connection is not affected by the throttling action of the adjustable needle valve 24.

Extending rearward from the base 26 is a thermostatic element comprising a tube 29, which may conveniently be of brass, and which extends into the casing 13 of the unit heater, as clearly indicated in Figs. 1 and 2. Tube 29 is the expansible element of the thermostat, and its changes of length are communicated to the valve mechanism by means of a thrust rod 31 formed of any suitable material having a low or zero thermal coefficient of expansion. The rod 31 is provided with a collar 32 against which a coil compression spring 33 reacts, urging the rod to the rear in coactive relation with the closed rear end of the tube 29. The forward end of the rod 31 is slidable through an aperture in the base 26, and coacts with valve mechanism hereinafter described.

Mounted on the lower portion of the base is a double-walled metallic diaphragm or cell 35, which is connected by the passage 36 directly with the connection 28. The forward side of the cell 35 is fixed at the center of a plate 37 which is carried by the bifurcated lever 38. The lever 38 is pivoted at its lower ends, as indicated at 39, and is drawn inward, i. e., toward the base 26, by two coil tension springs 41. The rear ends of these springs are hooked to lugs on base 26, and the forward end of each spring is connected to the outer end of a corresponding arm 42, each arm being pivoted on the plate 37 at 43, and being adjustable with reference thereto by means of the thrust screws 44, which are shown in Figs. 3 and 4, as provided with check nuts to lock them in adjusted position.

The adjustment of screws 44 permits the adjustment of the tension of springs 41 and the springs are so adjusted that they will allow the bifurcated lever 38 to swing outward when the pressure in line 8, which is connected at 28 and consequently acts within the cell 35, attains a definite value. This pressure in line 28 is as high, and preferably slightly higher, than that which causes motor 21 to close valve 19, the last valve of the system to close.

We have assumed that valve 19 closes at 11 pounds, and it may be assumed that lever 38 will move to its outermost position when the pressure in branch line 8 reaches 13 pounds. The outward motion of lever 38 is limited by collision of the lever with the head of stop screw 45, the head of this screw entering a notch in the side of the lever 38, which notch is dimensioned to permit the desired range of movement.

Pivoted at 46 on base 26, and extending in a generally downward direction therefrom, is an arm 47 which carries at its lower end an adjustable thrust screw 48. This thrust screw rests on the forward side of the lever 38 so that the arm 47 is forced forward when cell 35 is distended. The levers 38 and 47 are held in thrust engagement with each other by a coil tension spring 49 which extends between the two.

Formed integral with the arm 47 is a plate 51 on which is mounted a leak port 52, the leak port being connected by a coil tube 53 with a passage 54 leading to the connection 27, and consequently in direct communication with the branch extension 25 beyond the restricting needle valve 24. It will be remembered that the branch 25 connects freely with the bellows motor 21.

The arm 47 and plate 51 are provided with forwardly projecting lugs 55 between which is mounted a swinging valve member 56, the member 56 turning on the pivot screws 57. The valve member 56 coacts with the end of leak port 52, in a familiar manner, and is yieldingly urged into sealing engagement with the leak port by any suitable means, here illustrated as a coil tension spring 58, extending from the valve member 56 to a support carried by the base 26. The valve 56 is forced away from its sealing engagement with the end of leak port 52, by contraction of the thermostatic element 29. The desired result is effected by bringing the rod 31 into thrust engagement with the valve member 56, the adjustable thrust screw 59 being provided for this purpose.

A cover 61, of conventional form, is attached to the base 26, and encloses the moving parts above described.

It will be understood that steam or other suitable heating medium is supplied to the valves 11, 19 and 22, and that the fan in the unit heater, if a fan be used, is running. It is also understood that compressed air, under suitable pressure of about 15 pounds, is supplied through the main 7. As the temperature in the room rises, the thermostat 6 will establish an increasing pressure in the branch line 8. The first effect will be progressive closing of valve 11 to shut down the radiator 12. This valve, under the conditions assumed, will close at a pressure of 4 pounds gage. Continued rise of temperature in the room, and consequently continued rise of pressure in the branch line 8, will result in the closure of the valve 22 by a branch line pressure of 8 pounds gage. Continued rise of line pressure, as the result of rise of temperature, will result in the closure of valve 19 when the pressure in the line 8 reaches 11 pounds gage.

It will be understood from a consideration of Fig. 3 that a falling temperature affecting tube 29 will cause opening of the leak port 52. For purposes of explanation, it will be assumed that screw 59 is so adjusted that leak port 52 will commence to open as the temperature in the duct falls below 65°. As the valve 19 approaches its closed position, or when it closes, much depending on outdoor temperature, a condition will be reached at which the air passing in contact with tube 29 will be lower than the assumed setting of the duct thermostat. When that occurs, valve 56 will open leak port 52 more or less. The maximum capacity of the leak port 52 exceeds the adjusted capacity of the needle valve 24, so that the effect is to bleed air from the motor 21 at a rate dependent on the amount the duct temperature falls below the desired minimum setting. The duct thermostat therefore acts to supersede the room thermostat 6 in the control of the valve 19 and cause the unit 14 to supply sufficient heat to maintain the air discharging at 18 at the desired minimum temperature, here assumed to be approximately 65°.

The springs 41, as has been explained, hold the lever 38 inward until the pressure in the line 8 reaches or exceeds 11 pounds gage, at which the valve 19 was closed.

Let us assume that the springs 41 are overpowered by a line pressure of 13 pounds. With 11 pounds in the line 8, the valves 11, 22 and 19 are closed, except that valve 19 may be opened by the secondary control effect of the thermostat 29. This condition would subsist until the line pressure rises to 13 pounds. Such a rise of pressure could be caused by a rise of room temperature occasioned by heat leakage from exposed pipes or solar radiation, in conjunction with the heating effect of unit 14 acting under the control of the thermostat 29. The rise of line pressure incident to this uncontrolled rise of room temperature, will eventually progressively shift the lever 38 forward with the result that the leak port 52 is carried forward, changing the adjustment of the duct thermostat by progressively reducing the temperature of its limiting response.

Desirable results could be secured by causing this readjustment of the thermostat to change the limiting temperature of air discharge from a normal value of 65° to a lower value, of say 55°. On a fall of room temperature the events would occur in reverse sequence.

For purposes of illustration the invention has been described as applied to a unit heater, but no limitation to this particular of device is contemplated. Furthermore, the invention has been described as embodied with thermostats of the well known pneumatic type, but electrical thermostats, and fluid pressure thermostats are also known, and are capable of adaptation to the carrying out of the operative principles characteristic of this invention. Except as expressly stated in the claims, no limitation to pneumatic thermostats is contemplated. In its broadest aspects the invention is applicable to space heating generally.

What is claimed is,—

1. The combination of a regulatable heat source; two automatic controls therefor, one automatic control responsive to temperature in a space heated by said source and having a normal operative range in which it controls said source through the entire regulatory range thereof, and an abnormal range beyond one limit of said normal range, and the other automatic control responsive to the rate of supply of heat to such space and serving to impose a limit thereon when the first control is in said abnormal range; and means for adjusting progressively the second automatic control operable by response to the first automatic control in said abnormal range.

2. The combination of a regulatable heat source; two automatic controls therefor, one automatic control responsive to temperature in a space heated by said source and having a normal operative range in which it controls said source through the entire regulatory range thereof and an abnormal higher temperature range beyond the upper limit of the normal range and the other automatic control responsive to the rate of supply of heat to such space and serving to establish a minimum rate of supply when the first control is in said abnormal range; and means for adjusting progressively the second automatic control to reduce such minimum, said means being operable by response of the first automatic control in said abnormal range.

3. The combination of controllable heating means for a room; a room thermostat connected to control said heating means and functioning to hold the room temperature between definite limits; an adjustable limiting thermostat subject to temperature adjacent said heating means also connected to control said heating means and functioning to prevent such adjacent temperature from passing a chosen limit; and means rendered active by said room thermostat when room temperature has passed one of said definite limits, to change the adjustment of said limiting thermostat to establish a different limit.

4. The combination of controllable heating means for a room; a room thermostat connected to control said heating means and functioning to hold room temperature between upper and lower limits; an adjustable limiting thermostat subject to temperature adjacent said heating means also connected to control said heating means and functioning to prevent such adjacent temperature from falling below a definite value; and means rendered active by said room thermostat when room temperature rises above said upper limit, to adjust said limiting thermostat to establish a lower limiting value.

5. The combination of a room; a heating system therefor comprising a duct conveying air to the room, at least part of such air being drawn from out of doors, and a controllable heater associated with said duct; a thermostat in said room connected to exert a primary control on said heater to maintain room temperature between a high and a low limit; an adjustable thermostat responsive to the temperature of air flowing through the duct and connected to exert a secndary control on said heater to establish a low limit for the temperature of air discharged into the room; and means rendered active by said room thermostat, when room temperature exceeds said high limit, to adjust said adjustable thermostat to reduce the low limit established thereby.

6. The combination of a thermostat of a type adapted to establish a pressure which varies progressively in response to variation of the temperature affecting the thermostat; a heat controlling pressure motor; a restricted pressure transmitting connection between said thermostat and said motor; an adjustable limiting thermostat connected to control venting of said motor; and pressure actuated means responsive to the pressure established by the first-named thermostat and arranged to adjust the second thermostat to establish a different limit.

7. The combination of a thermostat of a type adapted to establish a pressure which varies progressively in response to variations of the temperature affecting the thermostat; a heat controlling pressure motor responsive through its entire range to pressures varying through less than the range of pressures established by the thermostat; a restricted pressure transmitting connection between said thermostat and motor; an adjustable limiting thermostat connected to control venting of said motor; pressure actuated means subject to the pressure established by the first-named thermostat and connected to adjust the second thermostat progressively; and means for causing said pressure motor and said pressure actuated means to respond in different ranges of pressure variation.

8. The combination of a thermostat of a type adapted to establish a pressure which varies progressively in response to variations of temperature affecting the thermostat; a heat controlling pressure motor comprising a movable abutment and a return spring of such strength as to be overpowered by the abutment under a pressure less than the maximum developed by the thermostat; a restricted pressure transmitting connection between said thermostat and motor; an adjustable limiting thermostat connected to control venting of said motor; and a second pressure motor connected to adjust the limiting thermostat and comprising an abutment subject to the pressure developed by the first-named thermostat, and a return spring capable of resisting pressures sufficient to overpower the heat controlling pressure motor, but incapable of resisting the maximum pressure developed by the thermostat.

9. The combination of a control line; a pneumatic room thermostat serving to establish in said line a pressure which varies between an upper limit and a lower limit in accordance with temperature; a yieldingly loaded pressure motor having a restricted connection with said line, the loading being such that the motor will be moved through its entire range by pressures varying between said lower limit and a value intermediate said limits; heating means controlled by said pressure motor; an adjustable thermostat subject to temperature adjacent said heating means, and capable of variably venting said motor to exert a secondary control on said heater; and a second yieldingly loaded motor connected with said line and connected to actuate said adjusting means, the loading being such that the second motor will respond at pressures lower than said upper limit and not lower than said intermediate value.

OSCAR G. WARD.